United States Patent

[11] 3,611,837

| | | | |
|---|---|---|---|
| [72] | Inventor | Sumio Uozumi | |
| | | Toyota-shi, Japan | |
| [21] | Appl. No. | 844,930 | |
| [22] | Filed | July 25, 1969 | |
| [45] | Patented | Oct. 12, 1971 | |
| [73] | Assignee | Toyota Jidosha Kogyo Kabushiki Kaisha | |
| | | Toyota-shi, Japan | |
| [32] | Priority | July 31, 1968 | |
| [33] | | Japan | |
| [31] | | 43/53587 | |

[54] OIL PRESSURE CONTROL DEVICE FOR FLUID-TYPE AUTOMATIC TRANSMISSION SYSTEM
2 Claims, 2 Drawing Figs.

[52] U.S. Cl. .................................................. 74/867
[51] Int. Cl. .......................................... B60k 17/00
[50] Field of Search ........................................... 74/867, 868, 869

[56] References Cited
UNITED STATES PATENTS

| 3,394,622 | 7/1968 | Chana | 74/867 |
| 3,398,607 | 8/1968 | Chana | 74/868 |

*Primary Examiner*—C. J. Husar
*Attorney*—Harry G. Shapiro

ABSTRACT: This invention relates to an oil pressure control device for fluid-type automatic transmission system having a torque converter and a speed-changing device controlled by servosystems. The servosystems are actuated by the pressure of two separate hydraulic circuits, the pressure of one circuit is set by a pressure control valve and the pressure of the other circuit varies with the position of the engine throttle valve.

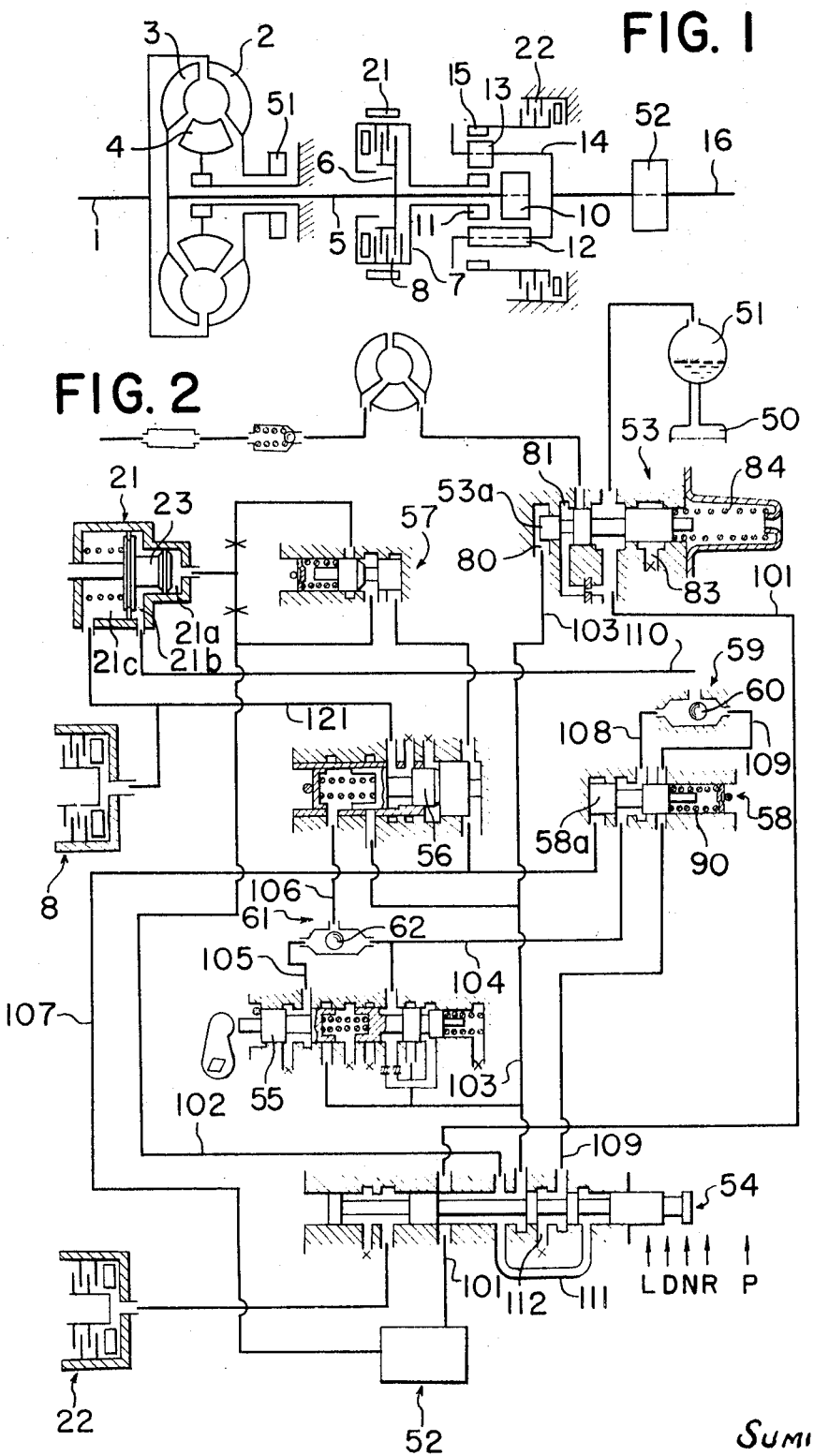

OIL PRESSURE CONTROL DEVICE FOR FLUID-TYPE AUTOMATIC TRANSMISSION SYSTEM

This invention relates to an oil pressure control system for a fluid-type automatic transmission used for vehicles such as automobiles.

An object of this invention is to provide an oil pressure control system for a fluid-type automatic transmission consisting of a fluid drive torque converter and a speed change gear fitted with a servomechanism, which transmission comprises separate hydraulic circuits to actuate the servomechanism. The oil pressure of one of the circuits is controlled by means of a pressure control valve and the oil pressure of the other circuit is controlled in accordance with the amount of engine throttle valve opening or intake manifold vacuum. This servomechanism is designed to operate within a wide range of torque converter speed ratios, i.e., from a low speed ratio demanded in starting the motor vehicle to a high speed ratio demanded during normal operation on an average road.

In an automatic transmission having a fluid drive torque converter or a fluid coupling and a speed change gear fitted with a hydraulic servomechanism, the present invention provides an oil pressure control system, the circuit of which is of such a design that the servomechanism is provided with at least a pair of oil pressure chambers, one chamber being supplied with a first oil pressure $Pl$ controlled by means of a pressure control mechanism, and the other chamber being furnished with a second oil pressure $Pth$ which varies in accordance with the amount of the engine throttle valve opening or the intake manifold vacuum. A changeover valve is provided in the hydraulic circuit furnishing oil pressure $Pth$, the changeover valve being operated by a pressure $Pgo$ in proportion to the speed of rotation of the transmission's output shaft. The changeover valve connects the second oil pressure $Pth$ circuit to the second servo chamber or discharges the second oil pressure $Pth$ to a manual valve. In the high-speed position of the transmission, this manual valve connects the second oil pressure $Pth$ to the control system discharge and, in the low-speed position it connects the discharge portion of the second oil pressure circuit $Pth$ to the aforementioned circuit supplying the oil pressure $Pl$ to the previously stated other chamber.

The oil pressure control system of this invention is designed for use in a hydraulic automatic transmission having a torque converter consisting of a pump, a turbine and a stator and the speed change gear the shift of which is controlled by means of brake bands and clutches.

These and other features, objects and advantages of the present invention will become more obvious from the following description when taken in connection with the accompanying drawing which shows, for purpose of illustration, one preferred embodiment in accordance with the present invention; in which:

FIG. 1 schematically shows an automatic transmission system to which the oil pressure control device of this invention is applied; and FIG. 2 shows a circuit diagram of an embodiment of an oil pressure control system according to this invention.

Referring now to the drawings, FIG. 1 thereof shows, in one form, a fluid-type automatic transmission which provides two forward speeds and one reverse speed having a torque converter which consists of a pump impeller 2, a turbine runner 3, a stator wheel 4 and a turbine shaft 5, the pump impeller 2 being directly coupled to an engine crankshaft 1. The engine power is transmitted from the pump impeller 2 to the turbine runner 3 through the fluid. The fluid is guided by the stator 4 to reenter the pump impeller 2.

This fluid circulation within the torque converter continuously transmits the rotational force to the input or turbine shaft 5. The torque thus transmitted to the turbine shaft 5 is further transmitted to the speed change gears attached at the rear of the torque converter, which will be described later. As is well known, a clutch 8 and brakes 21 and 22 which are automatically controlled by a servo oil pressure system, coact with a planetary gear set, to provide two forward speeds and one reverse speed.

The speed change gears attached at the rear of the torque converter are described below. The turbine shaft 5 connected to the turbine runner 3 transmits the torque as the input shaft to the planetary gear set which will be described below. On the input shaft 5 are fitted a hub 6 of the clutch 8 and an input sun gear 10. A low sun gear 11 is integrally mounted on to a clutch drum and disk 7 which is related with the hub 6 through a plurality of clutch plates. Pinions 12 and 13 are mounted on a carrier 14 which forms a unitary body with an output shaft 16. The pinion 12 is engaged with the input sun gear 10 and the pinion 13, while the pinion 13 is meshed with the low sun gear 11, a ring gear 15 and the pinion 12, and these elements constitute the planetary gear set. Around the drum of the clutch 8 is mounted a brake band of the low brake 21 for speed control. Also, between the drum of the ring gear 15 and the transmission case is located a reverse brake 22. An oil pump 51 is directly connected to the pump impeller 2 and is driven by power from the engine. A governor 52 is driven by the output shaft 16.

The operation of this two-speed transmission consisting of the above-mentioned components is as follows:

1st Speed: To obtain the first speed, i.e., a low speed, the brake band of the low brake 21 is tightened to retard rotation of the low sun gear 11 which is integral with the clutch 8. The speed of revolution from the input shaft is decreased and transmitted to the output shaft 16.

2nd Speed: To obtain the second speed, i.e., a high speed, engaging the clutch 8 causes the planetary gear set to operate in unison, and the input shaft 5 is thus connected directly to the output shaft 16.

Reverse: Operating the reverse brake 22 stops the revolution of the ring gear 15. The rotation from the input shaft 5 is reduced and reversed, and is transmitted to the output shaft 16, to provide the desired reverse speed.

The present invention provides an improved oil pressure control system employed for use in controlling the servo pressure to be exerted to the said clutch 8 and brakes 21 and 22. FIG. 2 shows the circuit diagram of the oil pressure control system of this invention, the system being illustrated in the condition of drive range (D range). In FIG. 2, the oil is drawn up from an oil reservoir 50 by the oil pump 51 which is directly driven by the engine through the pump impeller 2 (shown in FIG. 1), and it is supplied to a line pressure circuit 101 which in turn is supplied to a governor 52 after control by pressure control valve 53.

When the manual valve 54 is in D range, the controlled pressure is also supplied to the circuits 102 and 103. With the manual valve 54 in D range, the circuit 103 of the pressure control valve 53 communicates with the line pressure circuit 101 but in other ranges, the oil in the circuit 103 is being discharged; and therefore, the oil pressure controlled by the pressure control valve 53 (called the line pressure $Pl$) becomes lower in D range than that in other ranges.

A throttle valve 55 senses the amount of opening of the engine throttle valve (not illustrated) as plug displacement, and builds up in a circuit 104 an oil pressure proportional to the displacement or opening of the throttle. This oil pressure is called the throttle pressure $Pth$. Between the circuit 104 and the circuit 105 is located a check ball device 62, which is of such a design that when the throttle pressure $Pth$ is supplied from the circuit 104 to the circuit 106, the ball 62 moves leftward to block the circuit 105. The throttle plug blocks the pressure discharge circuit of the circuit 105 when the engine throttle valve is opened near the full-open position. Thus the circuit 105 communicates with the circuit 103 and the ball 62 is moved rightward by the line pressure $Pl$, blocking the circuit 104, and the line pressure is furnished to the circuit 106.

Meanwhile, the vehicle speed is detected by the governor 52 which is driven by the output shaft 16, and the governor pressure $Pgo$ is supplied to the circuit 107. On the left end surface of the valve member 58a of the changeover valve 58 through the hydraulic circuit 107, acts the governor pressure $Pgo$ produced in accordance with the vehicle speed. On the right end surface of the valve 58a member is provided a coil spring 90. The valve member 58a is controlled by the combination of the force of the coil spring 90 and the governor pressure Pgo, and moves to the right or left. The force of the coil spring 90 has been preset to a prescribed value, and therefore this changeover valve 58 is operated in accordance with the change of the governor pressure Pgo. That is, when the output shaft 16 is rotating at a low speed and the governor pressure Pgo is low, the valve member 58a of the changeover valve 58 is moved to the left by the force of the coil spring 90, the circuit 104 is communicated with the circuit 108 in order to supply the throttle pressure Pth in the circuit 104 to the piston chamber 21b of the brake servo 21 via the circuit 108 and the circuit 110.

When the circuit 104 communicates with the circuit 108 with the manual valve 54 in D range, the ball 60 of the check ball device ice 59 is pressed to the right to block the circuit 109, furnishing the throttle pressure Pth to the circuit 110. Subsequently, as the output shaft 16 rotates at a high speed and the governor pressure Pgo increases, the governor pressure Pgo overcomes the force of the coil spring 90, moving the valve member 58a to the right. As a result, the circuit 104 is disconnected from the circuit 108 and contrarily the circuit 108 communicates with the pressure discharge circuit 109, the oil pressure in the circuit 110 is discharged via the circuits 108 and 109. Namely, when the vehicle speed has reached a prescribed value, the changeover valve 58 blocks the circuit of the throttle pressure Pth acting on the chamber 21b of the brake servo 21, the oil pressure in the chamber 21b decreasing to zero. Consequently only the line pressure Pl of the chamber 21a is applied to the brake servo 21.

A shift valve 56 is designed to be operated by both the throttle pressure Pth and the governor pressure Pgo, changing the reduction ratio of the planetary gear set. That is, when the manual valve 54 is in D range, the line pressure Pl is supplied also to the circuit 102 communicating with the valve 54 and the servo piston chamber 21a of the brake servo 21, while the throttle pressure Pth regulated in accordance with the amount of the engine throttle valve opening is supplied to the servo piston chamber 21b of the brake servo 21 via the circuits 104, 108 and 110. When no oil pressure is present in the circuit 121, the brake band of the brake servo 21 is applied and the clutch 8 is released, the transmission being in the first speed gear. But when the vehicle speed has reached a prescribed value, the changeover valve 58 is pressed toward the right by means of the governor pressure Pgo, discharging the throttle pressure Pth acting on the servo piston chamber 21b, from the circuit 112 via the circuits 108 and 109. Also when the car speed has reached a certain speed suited for the throttle valve opening, the valve of the shift valve 56 is forced leftward by the governor pressure Pgo, connecting the circuit 103 and the circuit 121. As a result, the line pressure Pl acts not only upon the clutch 8 but also upon the pressure release side 21c of the servo piston 23, thus releasing the brake band 21 and operating the clutch 8. Therefore, the planetary gear set rotates as one body and accordingly the input shaft 5 and the output shaft 16 rotate as if directly coupled with each other, and the second or high speed is obtained. Shifting from the high speed direct drive to the low speed reduction drive is done by removing the oil pressure from the circuit 121 by means of the shift valve 56.

A braking force on the engine drive shaft 1 can be obtained by applying the line pressure Pl regulated by means of the pressure control valve 53 to the brake servo 21 and at the same time by applying the throttle pressure Pth in accordance with the amount of the engine throttle valve opening to the brake servo 21 through a separate circuit. When engine brake application is demanded by the driver during high-speed driving, the manual valve 54 is set to L position (Low range). When engine braking is required, the engine throttle valve is usually in the fully closed position and only a comparatively low throttle pressure Pth is being exerted to the chamber 21b which acts on the servo piston 23 of the brake servo 21, so that it is not sufficient to operate engine brake. To overcome this shortcoming, the circuit 109 is communicated with the circuit 111 to which the line pressure Pl is furnished, when the manual valve 54 is in L position. In D range, however, these circuits are disconnected in order to force the oil pressure in the circuit 109 back from the circuit 112 to the fluid reservoir 50. In L range therefore, a higher line pressure Pl than in D range is furnished to the servo piston chamber 21b via the circuits 111, 109, and 110, applying the engine brake sufficiently.

When the manual valve 54 is in R range, a higher line pressure Pl than in D range acts on the reverse brake 22, stopping the ring gear 15. The rotation from the input shaft 5 therefore is reversed and reduced and transmitted to the output shaft 16. Thus the reverse speed is obtainable.

When the manual valve 54 is placed in N range, the line pressure Pl circuit 101 is blocked by means of the manual valve 54, releasing all the friction elements such as the clutch 8 and brakes 21 and 22 by removing the pressure from their circuits. In this state, the input shaft 5 rotates without transmitting the engine power to the output shaft 16.

Also, with the manual valve 54 in P range, the line pressure Pl circuit 101 is blocked by the manual valve 54 as the same as in N range, and therefore all the friction elements including the clutch 8 and brakes 21 and 22 are released as the oil pressure is removed from their circuits by means of the manual valve 54. The output shaft 16 is mechanically locked from turning.

The pressure control valve 53 functions to control the line pressure Pl to the clutch 8 and the brakes 21 and 22. The left-hand chamber 81 of the valve 53a is furnished with the oil via the circuit 101 from the oil pump 51, while the right-hand chamber 83 is free of the oil pressure. To the chamber 80 at the extreme left of the valve 53a, the line pressure Pl is led from the circuit 101 via the circuit 103 only when the manual valve 54 is in D position. At the right end of the valve 53a is installed the coil spring 84. Therefore the valve 53a is controlled by the combination of the force of this coil spring 84 and the oil pressure acting on the left-hand chambers 80 and 81, moves rightward or leftward to discharge a surplus amount of oil from the chamber 83 for the purpose of controlling the line pressure Pl. In the D position of the manual valve 54, since the area on which the oil pressure acts to move the valve 53a to the right against the force of the coil spring 84 is larger by the amount of area of the valve relating with the chamber 80 than that in any of the L, N, R and P position, the line pressure Pl is regulated to a smaller, fixed pressure.

As previously described, in addition to the oil pressure being controlled by the pressure control valve, the oil pressure is controlled in accordance with the amount of engine throttle valve opening, which is directly furnished via a separate circuit.

It has been described above that the proper throttle pressure Pth is obtained by sensing the engine throttle valve opening. This throttle pressure may be obtained, needless to say, by equivalently sensing the intake manifold vacuum.

Although a preferred embodiment of the invention has been illustrated and described herein it will be understood that the invention is susceptible of various other modifications and adaptations within the scope of the appended claims.

What is claimed is:

1. In a fluid-type automatic transmission including an input shaft, an output shaft, a throttle valve and a governor actuated by the output shaft, a hydraulic control system comprising a hydraulically actuated servo means having a first pressure applying chamber, a second pressure applying chamber, and a pressure release chamber, fluid discharge means for the second pressure applying chamber, pressure control means in communication with the first pressure applying chamber to control the line pressure Pl, the second pressure-applying chamber being in communication with the throttle valve to provide throttle pressure Pth in proportion to the amount of opening of the throttle valve, a changeover valve in communication with and responsive to the governor acting to produce a variable governor pressure Pgo in proportion to the rate of rotation of the output shaft, the changeover valve being in communication with the second pressure-applying chamber.

2. In a fluid-type automatic transmission according to claim 1, further comprising a manual valve having a high-speed position and a low-speed position, and a system fluid discharge means for the hydraulic control system in communication with the manual valve, the fluid discharge means for the second pressure-applying chamber being in communication with the manual valve, the manual valve being in communication with the pressure control means, the manual valve in the high-speed position placing the system fluid discharge means in communication with the fluid discharge means for the second pressure-applying chamber, and in the low-speed position placing the fluid discharge means for the second pressure-applying chamber in communication with the pressure control means to supply line pressure to the second pressure-applying chamber.